US012008007B2

(12) United States Patent
Khuat et al.

(10) Patent No.: US 12,008,007 B2
(45) Date of Patent: Jun. 11, 2024

(54) LABELING SYSTEM AND METHOD FOR TIME-SERIES DATA

(71) Applicant: VINGROUP JOINT STOCK COMPANY, Ha Noi (VN)

(72) Inventors: Quang Ngoc Khuat, Ha Noi (VN); Minh Hieu Nguyen, Ha Noi (VN); Quy William Lee, Ha Noi (VN)

(73) Assignee: VINGROUP JOINT STOCK COMPANY, Ha Noi (VN)

( * ) Notice: Subject to any disclaimer, the term of this patent is extended or adjusted under 35 U.S.C. 154(b) by 12 days.

(21) Appl. No.: 17/854,578

(22) Filed: Jun. 30, 2022

(65) Prior Publication Data

US 2023/0009841 A1 Jan. 12, 2023

(30) Foreign Application Priority Data

Jul. 7, 2021 (VN) .............................. 1-2021-04164

(51) Int. Cl.
*G06F 16/2458* (2019.01)
*G06N 20/00* (2019.01)

(52) U.S. Cl.
CPC ......... *G06F 16/2477* (2019.01); *G06N 20/00* (2019.01)

(58) Field of Classification Search
CPC ........................... G06F 16/2477; G06N 20/00
See application file for complete search history.

(56) References Cited

U.S. PATENT DOCUMENTS

2017/0206469 A1\* 7/2017 Das ...................... G05B 13/048
2022/0245517 A1\* 8/2022 Duplessis .............. G06N 20/00

\* cited by examiner

*Primary Examiner* — Grace Park
(74) *Attorney, Agent, or Firm* — United One Law Group LLC; Kongsik Kim; Jhongwoo Peck

(57) ABSTRACT

A labeling method includes determining whether there is an intersection between the first annotated segment and the second annotated segment; if Yes, determining whether the first annotated segment and the second annotated segment have different labels from each other; if Yes, sending the label of the first annotated segment to the second agent unit and the label of the second annotated segment to the first agent unit; if No, determining whether a discrepancy-over-union ratio between the first annotated segment and the second annotated segment is below a first threshold; if Yes, determining the intersection of the first annotated segment and the second annotated segment as a final annotated segment for the piece of time-series data; if No, assigning a review tag to a union segment of the piece of time-series data which has a duration from a start of the first annotated segment to an end of the second annotated segment.

19 Claims, 10 Drawing Sheets

FIG. 7

LABELING SYSTEM AND METHOD FOR TIME-SERIES DATA

CROSS-REFERENCE TO RELATED APPLICATIONS

This application claims priority to Vietnamese Application No. 1-2021-04164 filed on Jul. 7, 2021, which application is incorporated herein by reference in its entirety.

BACKGROUND

1. Technical Field

Embodiments relate to a labeling system and method for time-series data.

2. Related Art

In the earlier labeling systems, images are annotated manually by annotators. There are two disadvantages with this approach.

The first is a considerable level of human labor is required for manual annotation. For example, the amount of data is large and often collected at 50 Hz, hence the time and effort used for manual annotation and validation is substantial. The required amount of data to train this type of AI model is large due to the diversity in the way human perform activities. For example: There are different ways a person performs a walking activity, and it is even much more diverse for another person to perform the same activity.

The second is the annotation inaccuracy due to the subjectivity of human perception. The definition of activities is vague, hence there is high inconsistency in annotation results between different annotators on the same piece of time-series data.

Therefore, there is a need for a method that increases the speed of annotation but also addresses the problem of large diversity in data.

SUMMARY

The present invention is directed to providing a labeling system and method for time-series data.

Problems to be solved in the embodiments are not limited thereto and include the following technical solutions and also objectives or effects understandable from the embodiments.

According to an aspect of the present invention, there is provided a labeling method comprising steps of S1: feeding a piece of time-series data to a first agent unit and a second agent unit; S2: annotating, by the first agent unit, the piece of time-series data to generate a first annotated piece of time-series data with at least one first annotated segment; S3: annotating, by the second agent unit, the piece of time-series data to generate a second annotated piece of time-series data with at least one second annotated segment; S4: processing, by a labeling apparatus, the first annotated piece of time-series data and the second annotated piece of time-series data, wherein the processing comprises:

- S41: determining whether there is an intersection between the first annotated segment and the second annotated segment, if Yes, go to S42, if No, end the processing;
- S42: determining whether the first annotated segment and the second annotated segment have different labels from each other, if Yes, go to S43, if No, go to S44;
- S43: sending the label of the first annotated segment to the second agent unit and the label of the second annotated segment to the first agent unit;
- S44: determining whether a discrepancy-over-union ratio between the first annotated segment and the second annotated segment is below a first threshold, if Yes, go to S45, if No, go to S46;
- S45: determining the intersection of the first annotated segment and the second annotated segment as a final annotated segment for the piece of time-series data; and
- S46: assigning a review tag to a union segment of the piece of time-series data which has a duration from a start of the first annotated segment to an end of the second annotated segment.

According to an embodiment of the present invention, the method further comprises S48 of recommending, after determining whether there is an intersection between each first annotated segment and each second annotated segment, at least one stand-alone segment of one unit of the first and second agent units, which do not intersect with any segment of the other unit of the first and second agent units, to one or more units of the first and second agent units as recommend tags.

According to an embodiment of the present invention, the steps S2 and S3 for annotating the piece of time-series data are performed by artificial intelligence (AI) models.

According to an embodiment of the present invention, the steps S2 and S3 for annotating the piece of time-series data are performed by users.

According to an embodiment of the present invention, the first agent unit and the second agent unit include artificial intelligence (AI) models for assisting the user on reviewing the disparity between user works on the piece of time-series data.

According to an embodiment of the present invention, the step S44 comprises determining whether an intersection-over-union ratio between the first annotated segment and the second annotated segment exceeds a second threshold, if Yes, go to S45, if No, go to S46.

According to an embodiment of the present invention, the step S43 further comprises returning to S2 to annotate the piece of time-series data based on the label of the second annotated segment sent to the first agent unit; and returning to S3 to annotate the piece of time-series data based on the label of the first annotated segment sent to the second agent unit.

According to an embodiment of the present invention, the step S46 further comprises returning to S2 to annotate the piece of time-series data based on the assigned review tag; and returning to S3 to annotate the piece of time-series data based on the assigned review tag.

According to an embodiment of the present invention, the discrepancy-over-union ratio between the first annotated segment and the second annotated segment is computed using the following equation:

$$XoU = \frac{(|start_1 - start_2| + |end_1 - end_2|)}{\max\left(\max(end_1, end_2) - \min(start_1, start_2), 10^{-6}\right)}$$

where, $start_1$ is the start of the first annotated segment, $start_2$ is the start of the second annotated segment, $end_1$ is the end of the first annotated segment, and $end_2$ is the end of the second annotated segment.

According to another aspect of the present invention, there is provided a labeling system comprising a first agent unit is configured to annotate a piece of time-series data to generate a first annotated piece of time-series data with at least one first annotated segment; a second agent unit is configured to annotate the piece of time-series data to generate a second annotated piece of time-series data with at least one second annotated segment; a labeling apparatus is configured to process the first annotated piece of time-series data and the second annotated piece of time-series data, wherein the processing comprises:

S41: determining whether there is an intersection between the first annotated segment and the second annotated segment, if Yes, go to S42, if No, end the processing;

S42: determining whether the first annotated segment and the second annotated segment have different labels from each other, if Yes, go to S43, if No, go to S44;

S43: sending the label of the first annotated segment to the second agent unit and the label of the second annotated segment to the first agent unit;

S44: determining whether a discrepancy-over-union ratio between the first annotated segment and the second annotated segment is below a first threshold, if Yes, go to S45, if No, go to S46;

S45: determining the intersection of the first annotated segment and the second annotated segment as a final annotated segment for the piece of time-series data; and S46: assigning a review tag to a union segment of the piece of time-series data which has a duration from a start of the first annotated segment to an end of the second annotated segment.

According to an embodiment of the present invention, the system is further configured to recommend, after determining whether there is an intersection between each first annotated segment and each second annotated segment, at least one stand-alone segment of one unit of the first and second agent units, which do not intersect with any segment of the other unit of the first and second agent units, to one or more units of the first and second agent units as recommend tags.

According to an embodiment of the present invention, the first agent unit and second agent unit using artificial intelligence (AI) models for annotating the piece of time-series data.

According to an embodiment of the present invention, the first agent unit and second agent unit are used by users for annotating the piece of time-series data.

According to an embodiment of the present invention, the first agent unit is configured to annotate the piece of time-series data based on the label of the second annotated segment sent to the first agent unit; and the second agent unit is configured to annotate the piece of time-series data based on the label of the first annotated segment sent to the second agent unit.

According to an embodiment of the present invention, the first agent unit is configured to annotate the piece of time-series data based on the assigned review tag; and the second agent unit is configured to annotate the piece of time-series data based on the assigned review tag.

According to yet another aspect of the present invention, there is provided a non-transitory computer-readable storage medium comprising instructions which, when executed by at least one processor of a machine, cause the machine to perform operations comprising S1: feeding a piece of time-series data to a first agent unit and a second agent unit; S2: annotating, by the first agent unit, the piece of time-series data to generate a first annotated piece of time-series data with at least one first annotated segment; S3: annotating, by the second agent unit, the piece of time-series data to generate a second annotated piece of time-series data with at least one second annotated segment; S4: processing, by a labeling apparatus, the first annotated piece of time-series data and the second annotated piece of time-series data, wherein the processing comprises:

S41: determining whether there is an intersection between the first annotated segment and the second annotated segment, if Yes, go to S42, if No, end the processing;

S42: determining whether the first annotated segment and the second annotated segment have different labels from each other, if Yes, go to S43, if No, go to S44;

S43: sending the label of the first annotated segment to the second agent unit and the label of the second annotated segment to the first agent unit;

S44: determining whether a discrepancy-over-union ratio between the first annotated segment and the second annotated segment is below a first threshold, if Yes, go to S45, if No, go to S46;

S45: determining the intersection of the first annotated segment and the second annotated segment as a final annotated segment for the piece of time-series data; and S46: assigning a review tag to a union segment of the piece of time-series data which has a duration from a start of the first annotated segment to an end of the second annotated segment.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

While the present invention may have various modifications and alternative forms, specific embodiments thereof are shown by way of example in the drawings and will be described herein in detail. However, there is no intent to limit the present invention to the particular forms disclosed. On the contrary, the present invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the present invention. As used herein, the term "and/or" includes any and all combinations of one or more of the associated listed items.

It should be understood that when an element is referred to as being "connected" or "coupled" to another element, the element may be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting to the present invention. As used herein, the singular forms "a," "an," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

Our invention is a process to annotate a piece of time-series data with the aim to both automate data validation steps and increase data quality.

Figure 1A:
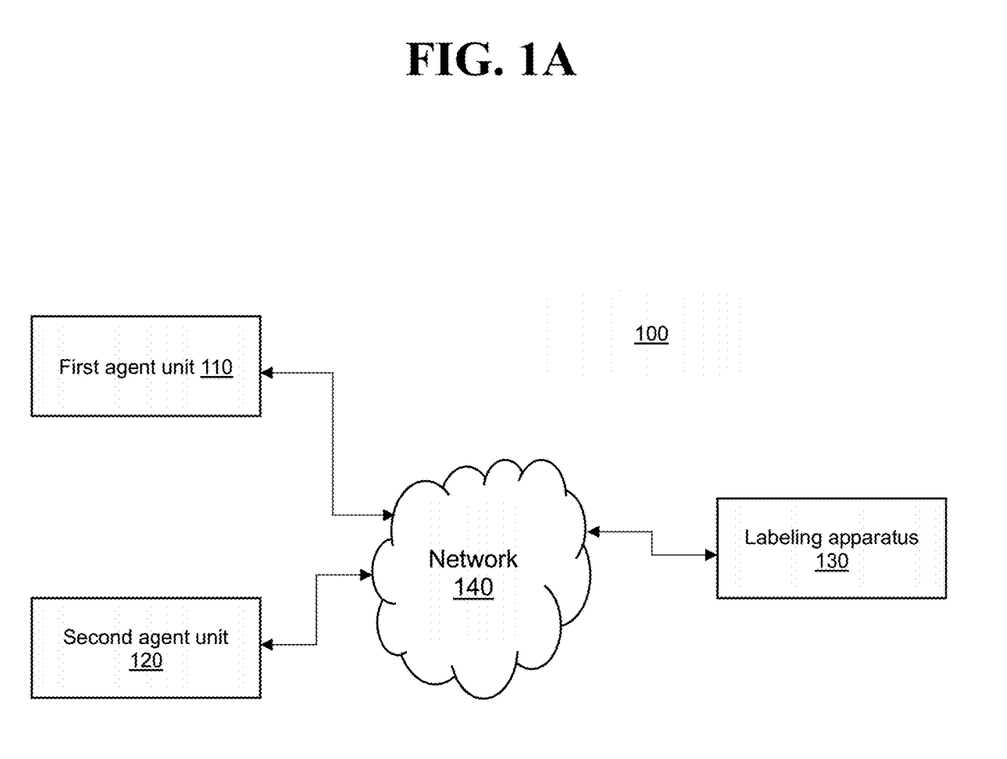
FIG. 1A is a block diagram of a labeling system according to an embodiment of the present invention.

Referring to FIG. 1A, a labeling system 100 according to an embodiment of the present invention may include a first agent unit 110, a second agent unit 120, and a labeling apparatus 130. The first agent unit 110 is configured to annotate a piece of time-series data to generate a first annotated piece of time-series data with at least one first annotated segment.

The second agent unit 120 is configured to annotate the piece of time-series data to generate a second annotated piece of time-series data with at least one second annotated segment.

The labeling apparatus 130 is configured to process the first annotated piece of time-series data and the second annotated piece of time-series data. The process of processing the first annotated piece of time-series data and the second annotated piece of time-series data in the labeling apparatus 130 may be described later.

According to an embodiment of the present invention, the first agent unit 110 and second agent unit 120 are used by users for annotating the piece of time-series data. At least one of the first agent unit 110 and the second agent unit 120 may be a device to which information is input by a user. For example, the first agent unit 110 may be a computing device that receives the piece of time-series data to generate the first annotated piece of time-series data with at least one first annotated segment. The user's job may be using the first agent unit 110 to manually annotate the piece of time-series data with given label list. And for each label annotated, the user may have to decide when the label starts and ends on the piece of time-series data. The user may be provided with in-house labeling tool to accommodate with the piece of time-series data. The user may label on video samples by doing drag-and-drop operations. After the labeling process, video data is synchronized with the corresponding piece of time-series data to get final labeling result.

According to an embodiment of the present invention, the first agent unit 110 and second agent unit 120 using artificial intelligence (AI) models for annotating the piece of time-series data.

According to an embodiment of the invention, one of the first agent unit 110 and the second agent unit 120 may be used by the user to annotate the piece of time-series data and the other of the first agent unit 110 the second agent unit 120 may include an AI model for annotating the piece of time-series data.

According to an embodiment of the present invention, the first agent unit 110 and second agent unit 120 may include artificial intelligence (AI) models for assisting the user on reviewing the disparity between user works on the piece of time-series data.

According to an embodiment of the present invention, the first agent unit 110 is configured to annotate the piece of time-series data based on the label of the second annotated segment sent to the first agent unit 110; and the second agent unit 120 is configured to annotate the piece of time-series data based on the label of the first annotated segment sent to the second agent unit 120. In S42, after the labeling apparatus 130 determines that the first annotated segment and the second annotated segment have different labels from each other, the label of the first annotated segment is sent back to the second agent unit and the label of the second annotated segment is sent back to the first agent unit for recommendation. Based on the recommended labels, the first agent unit 110 and the second agent unit 120 may reconsider label choices as there has been disagreement on label of the first annotated segment and the second annotated segment.

According to an embodiment of the present invention, the first agent unit 110 is configured to annotate the piece of time-series data based on the assigned review tag; and the second agent unit 120 is configured to annotate the piece of time-series data based on the assigned review tag. In step S46, after the labeling apparatus 130 assigns a review tag to a segment of the piece of time-series data which has a duration from a start of the first annotated segment to an end of the second annotated segment, the segment which is marked as "need to be reviewed" by the review tag is sent back to the first agent unit 110 and the second agent unit 120 for recommendation. Based on the assigned review tag, the first agent unit 110 and the second agent unit 120 may check and adjust the duration of the marked segment as there is disagreement on duration of the first annotated segment and the second annotated segment.

In FIG. 1A, only a first agent unit 110 and a second agent unit 120 are shown for convenience of description, but the labeling system according to an embodiment of the present invention may include two or more agent units.

According to an embodiment of the present invention, the labeling system 100 may be a distributed system in which the first agent unit 110, the second agent unit 120, and the labeling apparatus 130 may be communicated to each other through a network 140. The network 140 may be a wired or wireless network. The network 140 may be interne, intranet, extranet, LAN or the like.

Figure 1B:
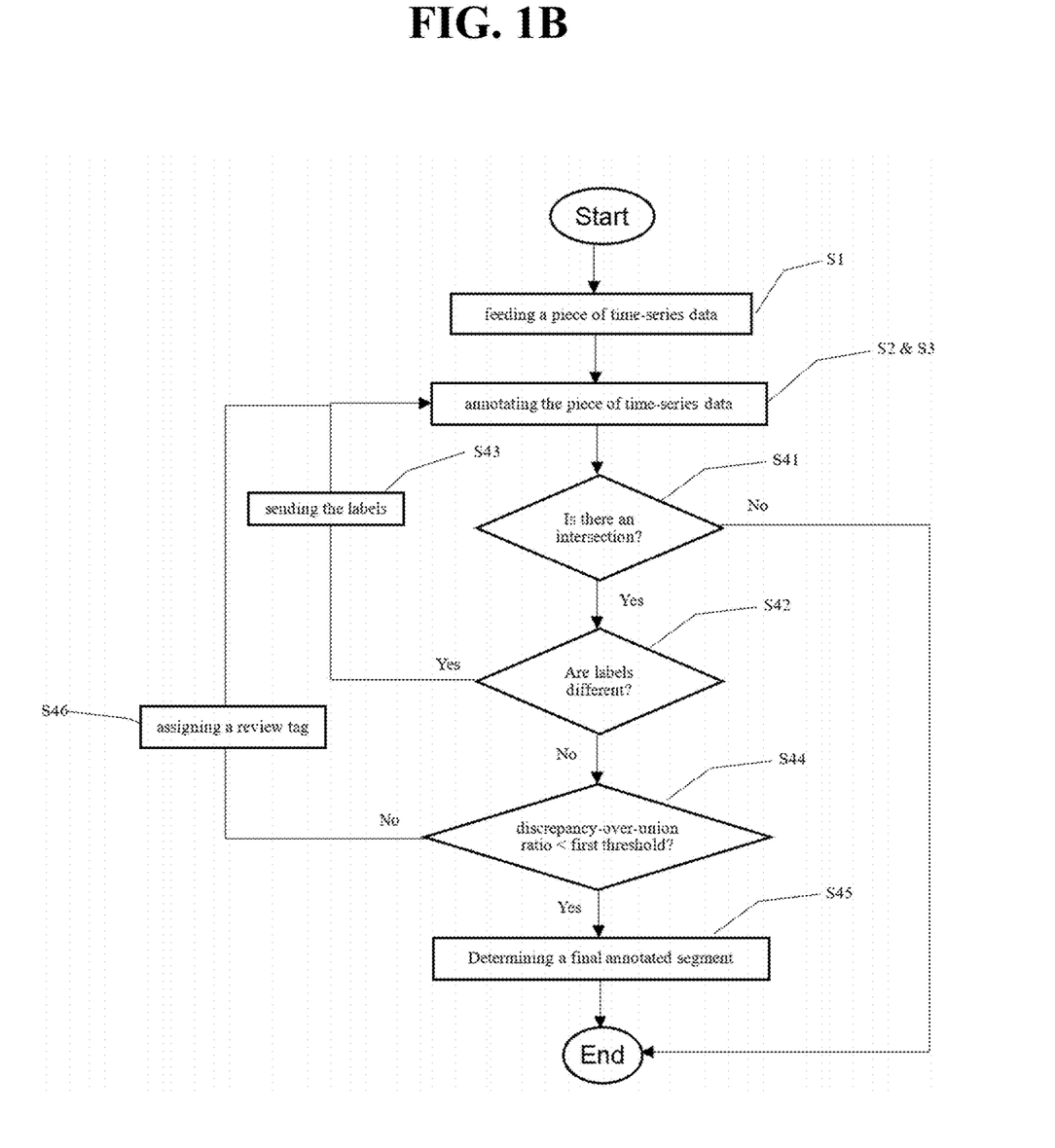
FIG. 1B is a flowchart illustrating a process of the labeling method according to an embodiment of the present invention.

Referring to FIG. 1B, a labeling method according to an embodiment of the present invention is described. The method may comprise steps of:

S1: feeding a piece of time-series data to a first agent unit 110 and a second agent unit 120;

S2: annotating, by the first agent unit 110, the piece of time-series data to generate a first annotated piece of time-series data with at least one first annotated segment;

S3: annotating, by the second agent unit 120, the piece of time-series data to generate a second annotated piece of time-series data with at least one second annotated segment;

S4: processing, by a labeling apparatus 130, the first annotated piece of time-series data and the second annotated piece of time-series data, wherein the processing comprises:

S41: determining whether there is an intersection between the first annotated segment and the second annotated segment, if Yes, go to S42, if No, end the processing;

S42: determining whether the first annotated segment and the second annotated segment have different labels from each other, if Yes, go to S43, if No, go to S44;

S43: sending the label of the first annotated segment to the second agent unit 120 and the label of the second annotated segment to the first agent unit 110;

S44: determining whether a discrepancy-over-union ratio between the first annotated segment and the second annotated segment is below a first threshold, if Yes, go to S45, if No, go to S46. Preferably, the first threshold is defined by imperial experiments and is between 0.15-0.5. More preferably, the first threshold may be 0.2, 0.25, 0.3, 0.35, 0.4 and 0.45. According to an embodiment of the invention, an intersection-over-union ratio may be used instead of discrepancy-over-union ratio between the first annotated segment and the second annotated segment. In this case, S44 may comprise determining whether the intersection-over-union ratio between the first annotated segment and the second annotated segment exceeds a second threshold, if Yes, go to S45, if No, go to S46;

S45: determining the intersection of the first annotated segment and the second annotated segment as a final annotated segment for the piece of time-series data; and S46: assigning a review tag to a union segment of the piece of time-series data which has a duration from a start of the first annotated segment to an end of the second annotated segment.

Figure 1C:
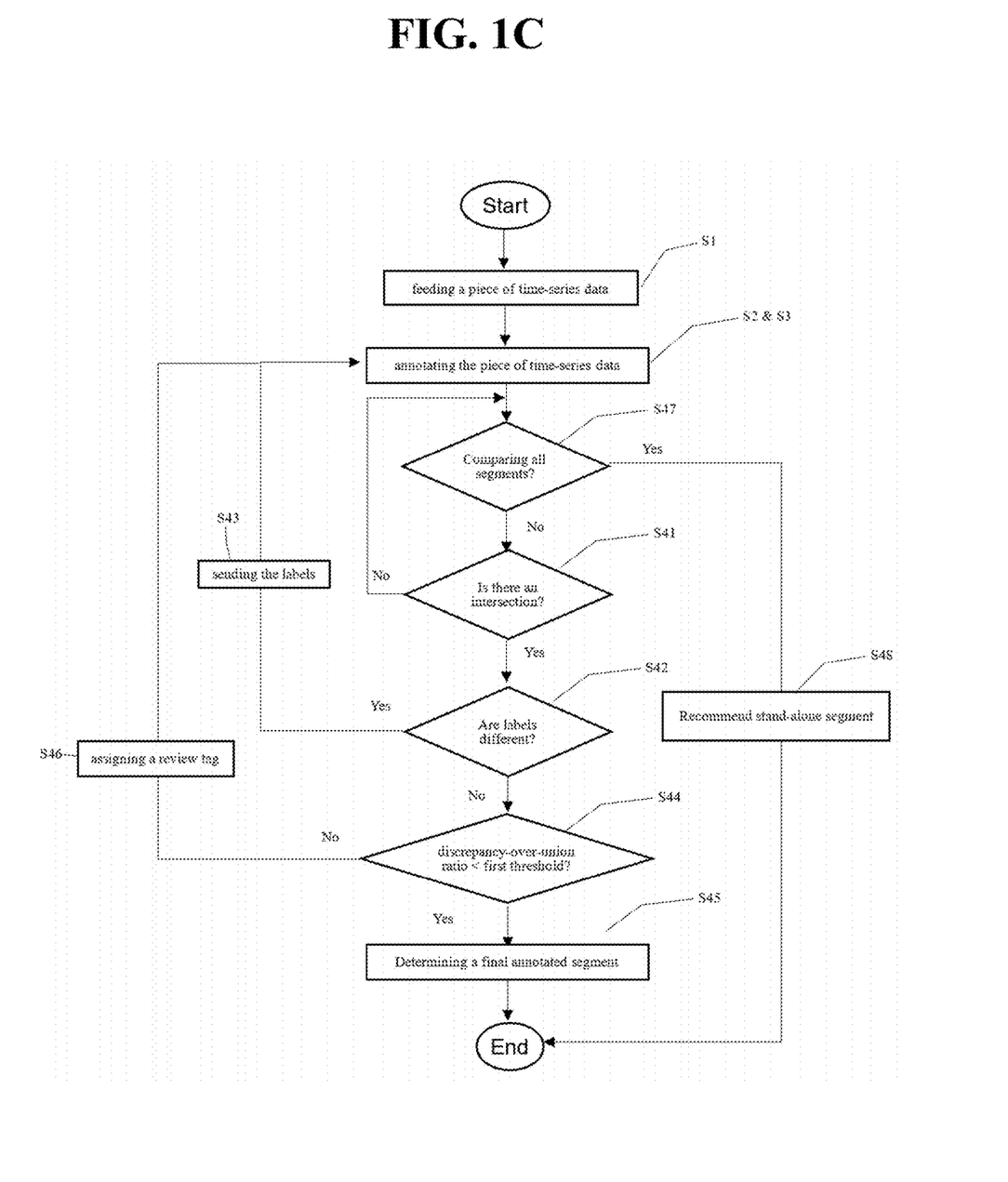
FIG. 1C is a flowchart illustrating a process of the labeling method according to another embodiment of the present invention.

Referring to FIG. 1C illustrating a process of the labeling method according to another embodiment of the present invention, the method further comprises S48 of recommending, after determining whether there is an intersection between each first annotated segment and each second annotated segment, at least one stand-alone segment of one unit of the first and second agent units, which do not intersect with any segment of the other unit of the first and second agent units, to one or more units of the first and second agent units as recommend tags. S48 may be performed after the labeling apparatus 130 determines that all first and second annotated segments are compared with each other (S47).

According to an embodiment of the present invention, the steps S2 and S3 for annotating the piece of time-series data are performed by artificial intelligence (AI) models.

According to an embodiment of the present invention, the steps S2 and S3 for annotating the piece of time-series data are performed by users.

According to an embodiment of the present invention, the first agent unit 110 and the second agent unit 120 include artificial intelligence (AI) models for assisting the user on reviewing the disparity between user works on the piece of time-series data.

According to an embodiment of the present invention, the step S43 further comprises returning to S2 to annotate the piece of time-series data based on the label of the second annotated segment sent to the first agent unit 110; and returning to S3 to annotate the piece of time-series data based on the label of the first annotated segment sent to the second agent unit 120. Steps from S2-S43 may be repeat until the final annotated segment is decided.

According to an embodiment of the present invention, the step S46 further comprises returning to S2 to annotate the piece of time-series data based on the assigned review tag; and returning to S3 to annotate the piece of time-series data based on the assigned review tag. Steps from S2-S46 may be repeat until the final annotated segment is decided.

According to an embodiment of the present invention, the discrepancy-over-union (XoU) ratio between the first annotated segment and the second annotated segment is computed using the following equation:

$$XoU = \frac{(|start_1 - start_2| + |end_1 - end_2|)}{\max\left(\max(end_1, end_2) - \min(start_1, start_2), 10^{-6}\right)}$$

where, $start_1$ is the start of the first annotated segment, $start_2$ is the start of the second annotated segment, $end_1$ is the end of the first annotated segment, and $end_2$ is the end of the second annotated segment.

Figure 2:
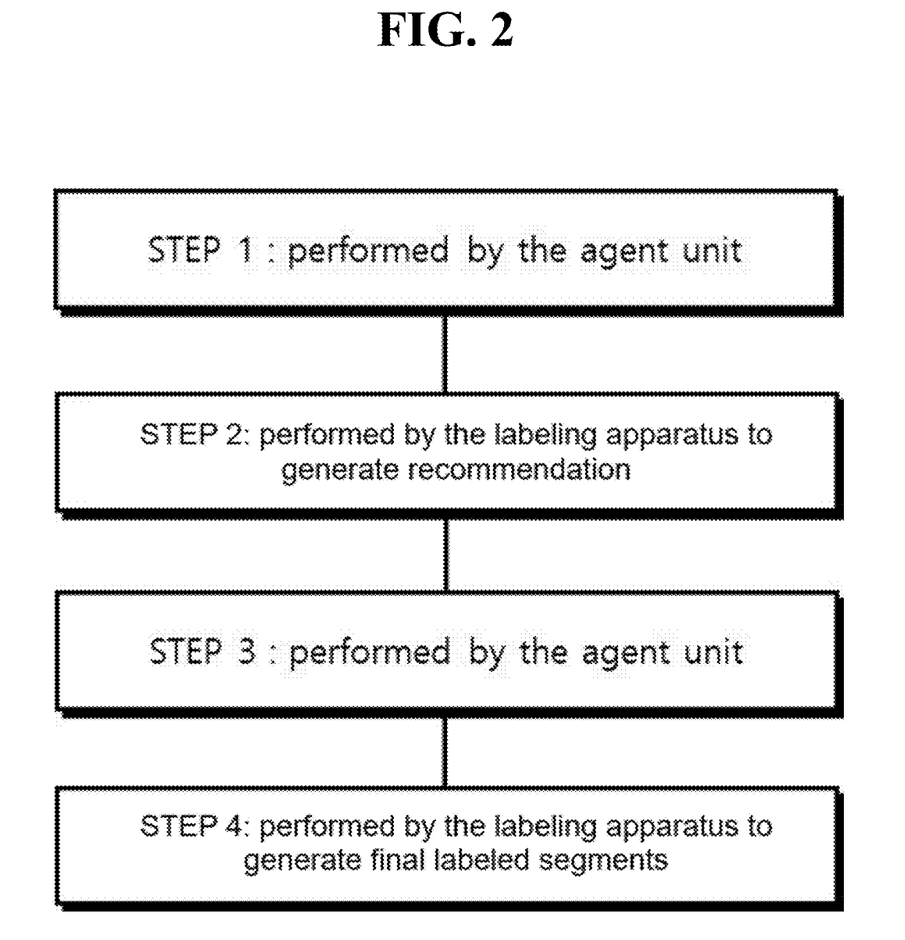
FIG. 2 is a flowchart illustrating a process of the labeling method according to an embodiment of the present invention.

FIG. 2 is a flowchart illustrating a process of the labeling system according to an embodiment of the present invention.

Referring to FIG. 2, the labeling method according to an embodiment of the present invention may be implemented as a process including four stages.

The first stage may be performed by a plurality of agent units. In the first stage, each agent unit may receive a piece of time-series data. And, for the piece of time-series data, each agent unit may annotate the piece of time-series data to generate at least one annotated segment. Each of the at least one annotated segment defines the start point and end point of events (labels) occurred inside given piece of time-series data.

The piece of time-series data is sequence of measurements recorded from a same source in successive timestamps. These measurements can be sensor data, stock prices, image frames, etc. And the label in piece of time-series data can be considered as an event point occurred in given data with semantic meaning defined, with constraint of start timestamp and end timestamp.

The second stage may be performed in the labeling apparatus 130. In the second stage, the labeling apparatus 130 compares a plurality of annotated segments and generates the recommendation for each agent. The labeling apparatus 130 may generate the recommendation through a condition related to the intersection. When the recommendation is generated, the labeling apparatus 130 may send the recommendation to a plurality of agent units. In this case, the third stage may proceed. On the other hand, when the recommendation is not generated, the labeling apparatus 130 may proceed to the fourth stage.

The third stage may be performed by a plurality of agent units. Each of the plurality of agent units may receive the recommendation and fix/change the annotated segment based on their opinions. The process would be the same as the first stage, except that agents have been given hints from recommendations and review tags to reconsider their decisions on current result. The third stage may not be performed if the recommendation is not generated in the second stage.

The fourth stage may be performed by the labeling apparatus 130. According to an embodiment, the labeling apparatus 130 may generate a final annotated segment using a plurality of annotated segments generated in the first stage. Alternatively, the labeling apparatus 130 may generate a final annotated segment using a plurality of annotated segments modified by recommendation.

A detailed description of each stage will be described in detail with reference to the drawings below.

Figure 3:
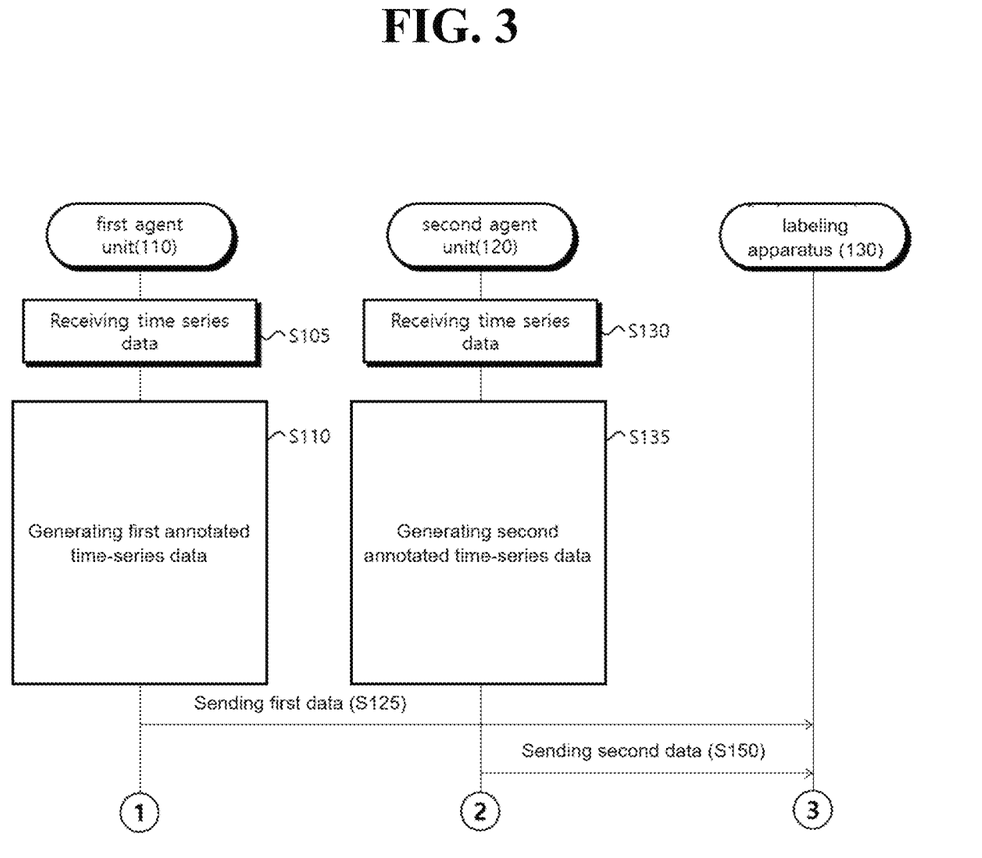
FIG. 3 is a flowchart showing a first stage process according to an embodiment of the present invention.

FIG. 3 is a flowchart showing a first stage process according to an embodiment of the present invention.

The first agent unit 110 may receive a piece of time-series data (S105).

The first agent unit 110 may determine the first label from the piece of time-series data. The first agent unit 110 may determine the first label by selecting a first start point and a first end point. That is, the first agent unit 110 may annotate a segment between the first start point and the first end point with the first label.

The first agent unit 110 may generate a first annotated piece of time-series data with at least one first annotated segment (S110).

The first agent unit 110 may send the first annotated piece of time-series data to the labeling apparatus 130 (S125).

The second agent unit 120 may receive the piece of time-series data (S130).

The second agent unit 120 may determine a second label from the piece of time-series data. The second agent unit 120 may determine the second label by selecting a second start point and a second end point. That is, the second agent unit 120 may annotate a segment between the second start point and the second end point with the second label.

The second agent unit 120 may generate a second annotated piece of time-series data with at least one second annotated segment (S135).

The second agent unit 120 may send the second annotated piece of time-series data to the labeling apparatus 130 (S150).

Figure 4:
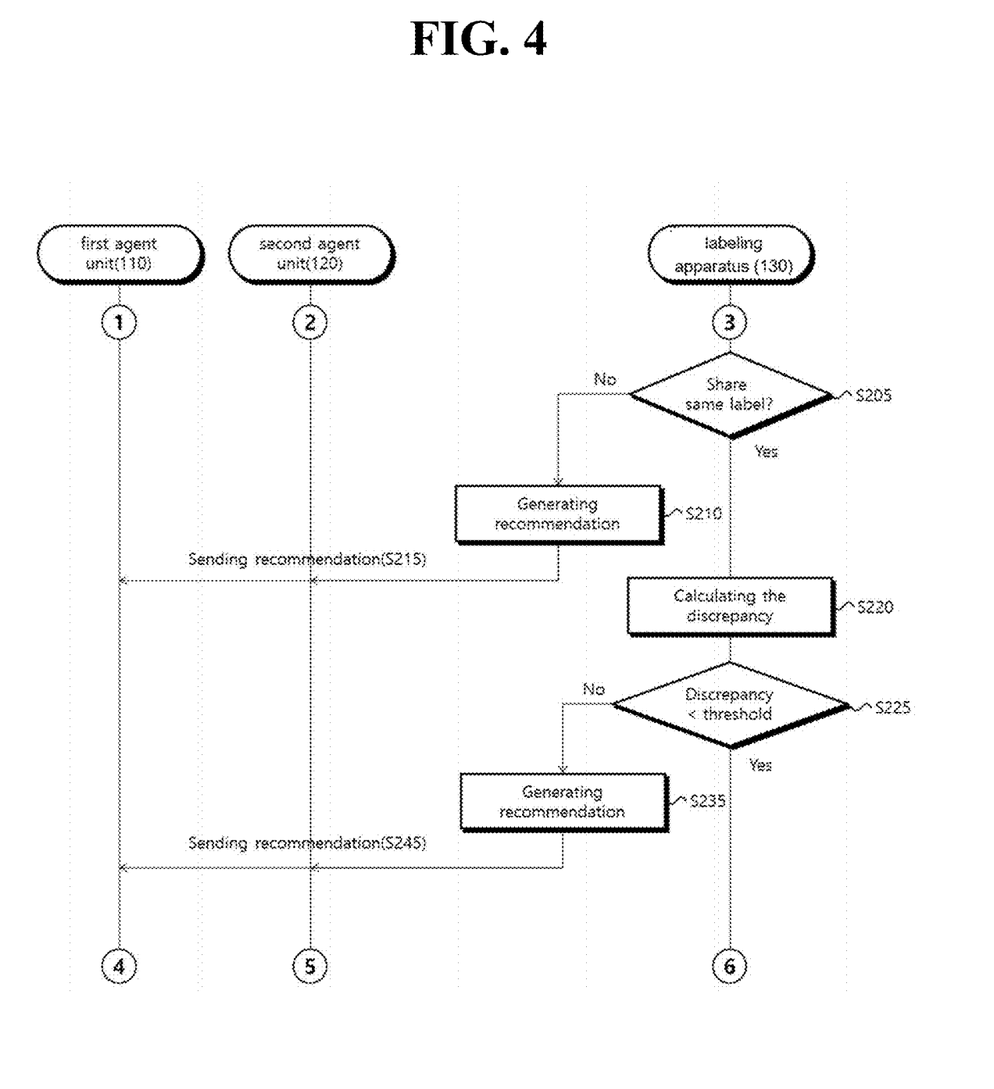
FIG. 4 is a flowchart showing a second stage process according to an embodiment of the present invention.

FIG. 4 is a flowchart showing a second stage process according to an embodiment of the present invention. FIG. 5A to 5D are diagrams for explaining a second stage.

The labeling apparatus 130 may compare the first annotated segment and the second annotated segment (S205). Specifically, the labeling apparatus 130 may compare whether the first annotated segment and the second annotated segment intersect each other. The first annotated piece of time-series data may comprise a plurality of first annotated segments. The second annotated piece of time-series data may comprise a plurality of second annotated segments. Each of the plurality of first annotated segments may be compared with each of the plurality of second annotated segments for determining whether there is an intersection between the first annotated segment and the second annotated segment.

Figure 5A:
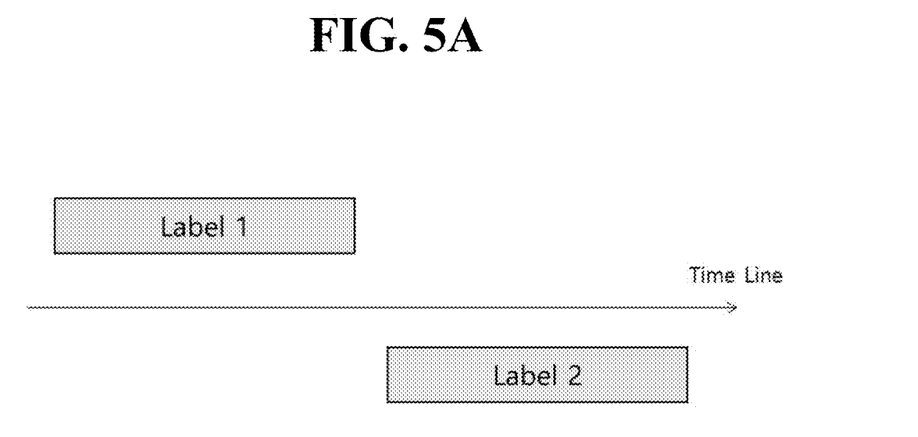
FIGS. 5A to 5D are diagrams for explaining a second stage.

According to an embodiment of the present invention, when the first annotated segment and the second annotated segment do not intersect each other or there is no pair of the first annotated segment and the second annotated segment left for comparison, the labeling apparatus 130 may end the processing. According to another embodiment of the present invention, when there is no pair of the first annotated segment and the second annotated segment left for comparison, the stand-alone segments of one unit of the first and second agent units, which do not intersect with any segment of the other unit of the first and second agent units, may be recommended to one or more units of the first and second agent units as recommend tags. For example, as illustrated in FIG. 5A, the first annotated segment and the second annotated segment do not intersect each other when the end point of the first annotated segment is less than the start point of the second annotated segment.

Figure 5B:
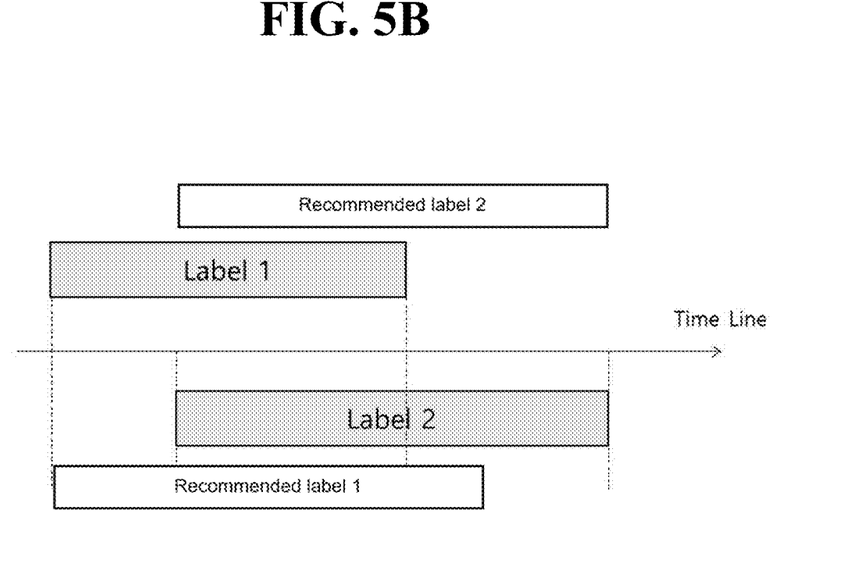

When the first annotated segment and the second annotated segment intersect each other, the labeling apparatus 130 may determine whether the first annotated segment and the second annotated segment have different labels from each other. In response to determining that the first annotated segment and the second annotated segment have different labels from each other, the labeling apparatus 130 may generate the recommendation for the first agent unit 110 and the recommendation for the second agent unit 120. According to an embodiment, as shown in FIG. 5B, the labeling apparatus 130 may generate the second label as a first recommendation for the first agent unit 110 and the first label as a second recommendation for the second agent unit 120.

The labeling apparatus 130 may send the generated recommendations to the first agent unit 110 and the second agent unit 120 (S215). The labeling apparatus 130 may send the first recommendation to the first agent unit 110 and the second recommendation to the second agent unit 120.

Figure 5C:
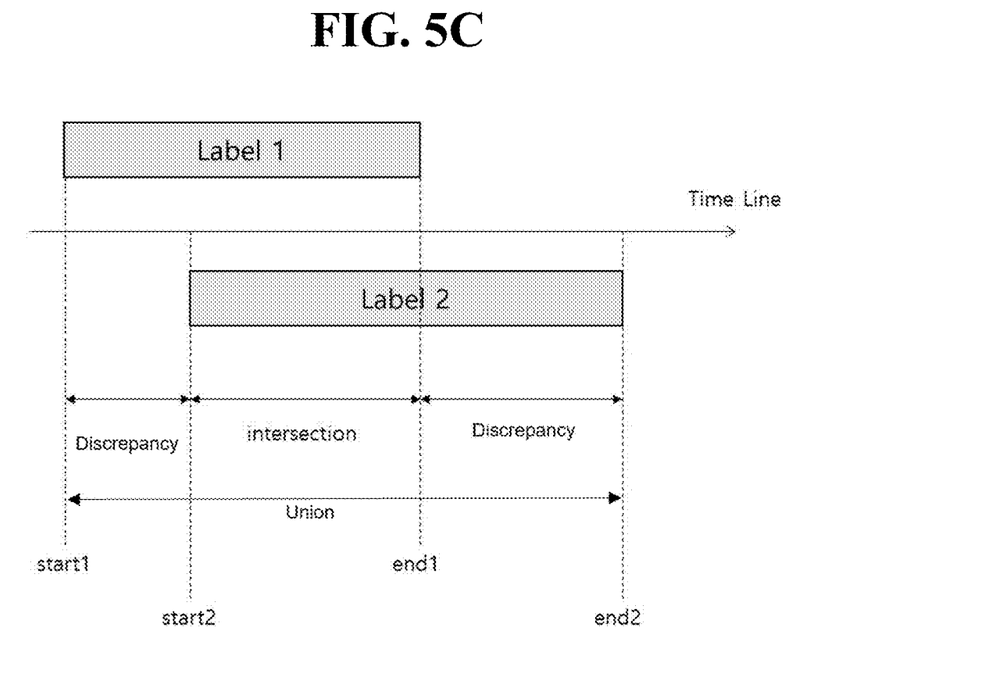

When the first annotated segment and the second annotated segment intersect each other, the labeling apparatus 130 may determine whether the first annotated segment and the second annotated segment have different labels from each other. In response to determining that the first annotated segment and the second annotated segment have the same labels, the labeling apparatus 130 may calculate the discrepancy-over-union ratio between the first annotated segment and the second annotated segment (S220). For example, as shown in FIG. 5C, when there is an intersection area between the first annotated segment and the second annotated segment on the timeline, the labeling apparatus 130 may calculate the discrepancy-over-union ratio between the first annotated segment and the second annotated segment.

The labeling apparatus 130 may calculate the discrepancy-over-union (XoU) ratio using Equation 1 below.

$$XoU = \frac{(|start_1 - start_2| + |end_1 - end_2|)}{\max\left(\max(end_1, end_2) - \min(start_1, start_2), 10^{-6}\right)} \quad \text{[Equation 1]}$$

Here, $start_1$ is the start of the first annotated segment, $start_2$ is the start of the second annotated segment, $end_1$ is the end of the first annotated segment, and $end_2$ is the end of the second annotated segment. The intersection segment has a duration from the start of the second annotated segment to the end of the first annotated segment. The union segment has a duration from the start of the first annotated segment to the end of the second annotated segment.

The labeling apparatus 130 may compare the discrepancy-over-union ratio with a predetermined first threshold (S225).

Figure 5D:
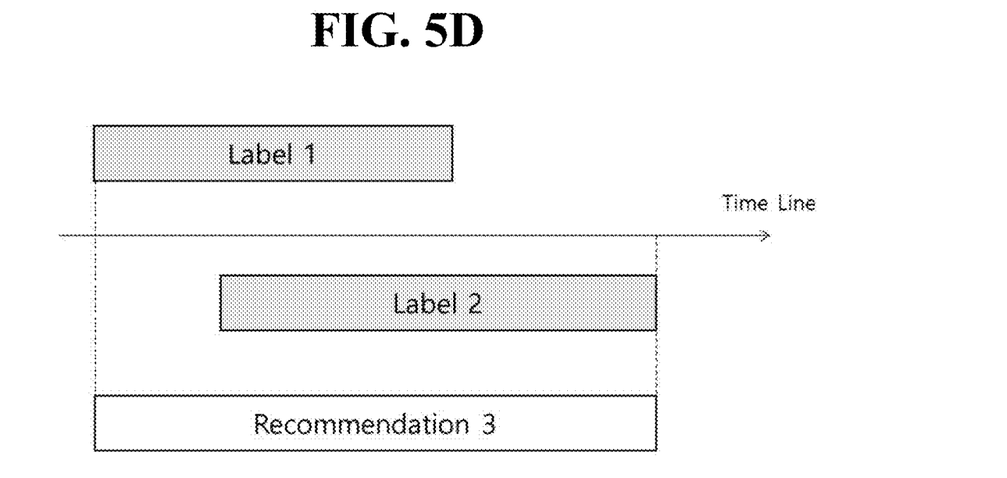

As a result of the comparison, if the calculated discrepancy-over-union ratio is greater than or equal to the threshold, the labeling apparatus 130 may generate the recommendation (S230). Specifically, the labeling apparatus 130 may generate a third recommendation combining the first annotated segment and the second annotated segment as the recommendation. For example, as shown in FIG. 5D, the labeling apparatus 130 may generate the third recommendation for the union segment having a duration from the start of the first annotated segment to the end of the second annotated segment. The third recommendation may be a review tag which marks the union segment with need-to-be-reviewed status.

The labeling apparatus 130 may send the generated recommendation to the first agent unit 110 and the second agent unit 120 (S215). The labeling apparatus 130 may transmit the third recommendation to the first agent unit 110 and the second agent unit 120.

Figure 6:
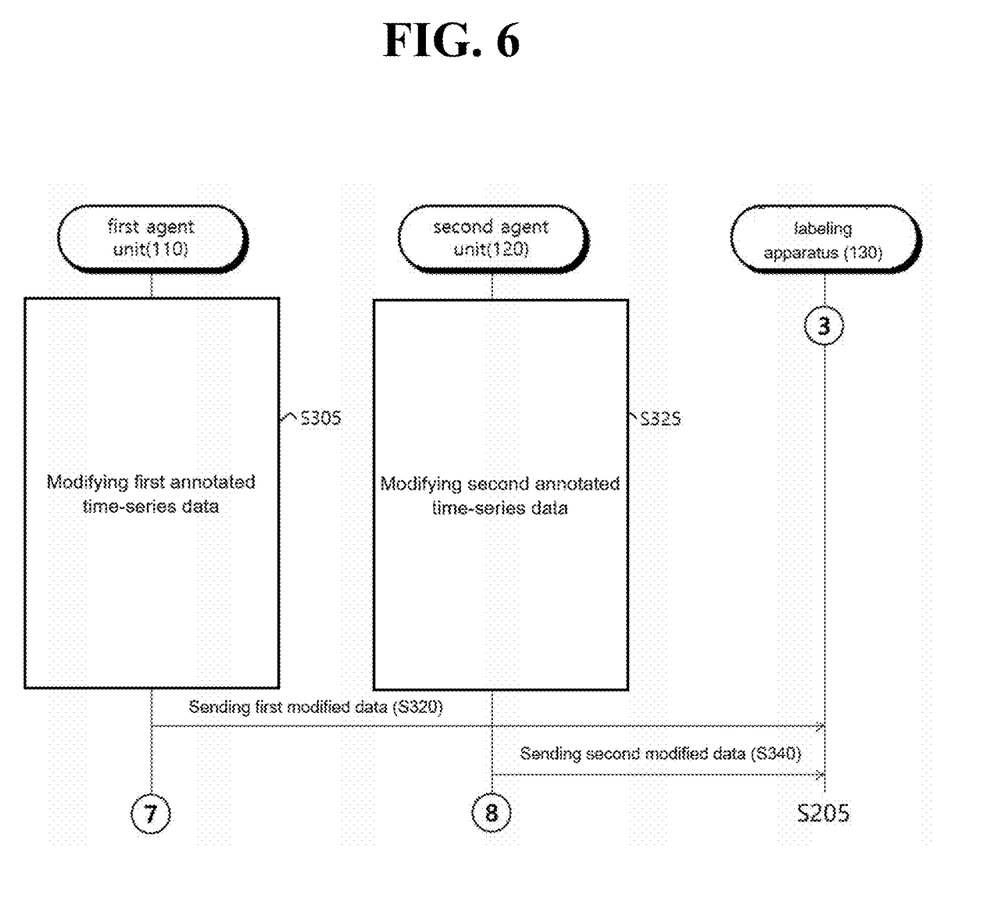
FIG. 6 is a flowchart showing the third stage process according to an embodiment of the present invention.

FIG. 6 is a flowchart showing the third stage process according to an embodiment of the present invention.

The first agent unit 110 may modify the first annotated time-series data based on the received recommendation (S305).

The first agent unit 110 may annotate the piece of time-series data based on the first recommendation. For example, the first agent unit 110 may modify the label of the first annotated segment based on the label of the second annotated segment sent to the first agent unit 110.

The first agent unit 110 may annotate the piece of time-series data based on the third recommendation. For example, the first agent unit 110 may modify the duration of the first annotated segment based on the assigned review tag of the union segment sent to the first agent unit 110.

The first agent unit 110 may send the first modified piece of time-series data to the labeling apparatus 130 (S320).

The second agent unit 120 may modify the second annotated time-series data based on the received recommendation (S325).

The second agent unit 120 may annotate the piece of time-series data based on the first recommendation. For example, the second agent unit 120 may modify the label of the second annotated segment based on the label of the first annotated segment sent to the second agent unit 120.

The second agent unit 120 may annotate the piece of time-series data based on the third recommendation. For example, the second agent unit 120 may modify the duration of the second annotated segment based on the assigned review tag of the union segment sent to the second agent unit 120.

The second agent unit 120 may send the second modified piece of time-series data to the labeling apparatus 130 (S340).

Then, the labeling apparatus 130 may perform a second stage process based on the first modified piece of time-series data and the second modified piece of time-series data.

Figure 7:
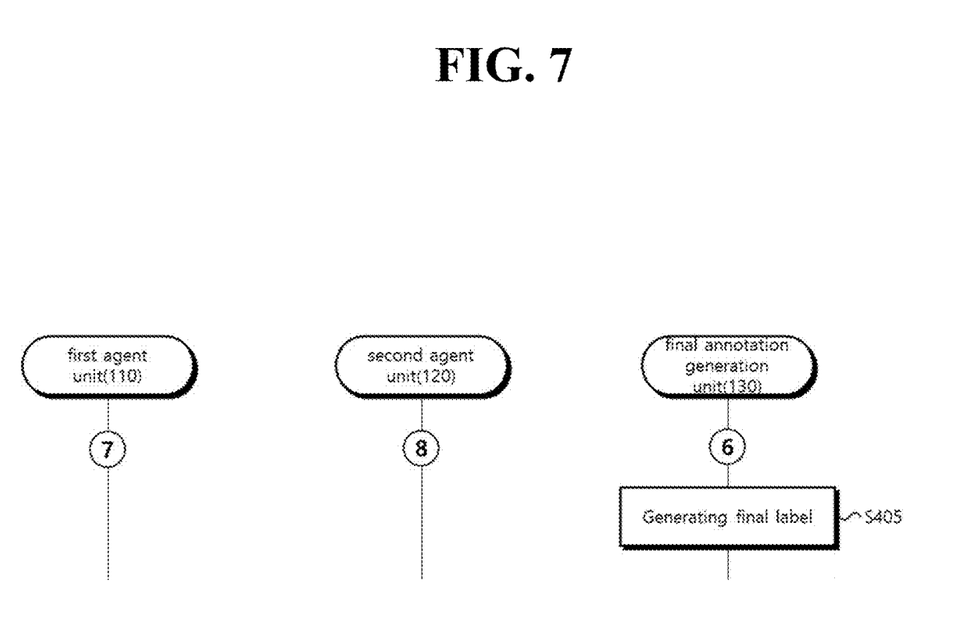
FIG. 7 is a flowchart showing the fourth stage process according to an embodiment of the present invention.

FIG. 7 is a flowchart showing the fourth stage process according to an embodiment of the present invention.

First, the labeling apparatus 130 may obtain the final annotated segment based on the first annotated piece of time-series data and the second annotated piece of time-series data received from the first agent unit 110 and the second agent unit 120 (S405). The first annotated piece of time-series data and the second annotated piece of time-series data may be the piece of time-series data annotated by the first agent unit 110 and the second agent unit 120, respectively, with or without recommendations.

According to an embodiment, the labeling apparatus 130 may obtain an intersection region between the first annotated segment and the second annotated segment as the final annotated segment. That is, when the first annotated segment and the second annotated segment are not modified because the recommendation for the first annotated segment and the second annotated segment is not generated, the labeling apparatus 130 may obtain the intersection area between the first annotated segment and the second annotated segment as the final annotated segment.

According to an embodiment, the labeling apparatus 130 may obtain an intersection region between the modified first annotated segment and the modified second annotated segment as the final annotated segment. That is, when the recommendation for the first annotated segment and the second annotated segment is generated to modify the first annotated segment and the second annotated segment, the labeling apparatus 130 may obtain the intersection region between the modified first annotated segment and the modified second annotated segment as the final annotated segment.

Various and beneficial advantages and effects of the present invention are not limited to the above descriptions and will be more easily understood in describing specific embodiments of the present invention.

Terms described in the specification such as "unit" refer to software or a hardware component such as a field-programmable gate array (FPGA) or an Application-Specific Integrated Circuit (ASIC), and the unit performs certain functions. However, the "unit" is not limited to software or hardware. The "unit" may be configured in a storage medium that may be addressed or may be configured to be executed by at least one processor. Therefore, examples of the "unit" include components such as software components, object-oriented software components, class components and task components, and processes, functions, attributes, procedures, subroutines, segments of program codes, drivers, firmware, micro codes, circuits, data, database, data structures, tables, arrays, and variables. Components and functions provided from "units" may be combined into a smaller number of components and "units" or may be further separated into additional components and "units." In addition, the components and the "units" may be implemented to playback one or more central processing units (CPUs) in a device or a secure multimedia card.

While the present invention has been described with reference to the embodiments, the embodiments are only exemplary embodiments of the present invention and do not limit the present invention, and those skilled in the art will appreciate that various modifications and applications, which are not exemplified in the above description, may be made without departing from the scope of the essential characteristic of the present exemplary embodiments. For example, each component described in detail in the embodiments can be modified. In addition, it should be understood that differences related to these modifications and applications are within the scope of the present invention as defined in the appended claims.

What is claimed is:

1. A labeling method comprising:
   S1: feeding a piece of time-series data to a first agent unit and a second agent unit;
   S2: annotating, by the first agent unit, the piece of time-series data to generate a first annotated piece of time-series data with at least one first annotated segment;
   S3: annotating, by the second agent unit, the piece of time-series data to generate a second annotated piece of time-series data with at least one second annotated segment; and
   S4: processing, by a labeling apparatus, the first annotated piece of time-series data and the second annotated piece of time-series data, wherein the processing comprises:

S41: determining whether there is an intersection between the first annotated segment and the second annotated segment,
in response to determining that there is an intersection between the first annotated segment and the second annotated segment, proceeding to S42, and
in response to determining that there is not an intersection between the first annotated segment and the second annotated segment, ending the processing;
S42: determining whether the first annotated segment and the second annotated segment have different labels from each other,
in response to determining that the first annotated segment and the second annotated segment have different labels from each other, proceeding to S43, and
in response to determining that the first annotated segment and the second annotated segment do not have different labels from each other, proceeding to S44;
S43: sending the label of the first annotated segment to the second agent unit and the label of the second annotated segment to the first agent unit;
S44: determining whether a discrepancy-over-union ratio between the first annotated segment and the second annotated segment is below a first threshold,
in response to determining that the discrepancy-over-union ratio between the first annotated segment and the second annotated segment is below the first threshold, proceeding to S45, and
in response to determining that the discrepancy-over-union ratio between the first annotated segment and the second annotated segment is not below the first threshold, proceeding to S46;
S45: determining the intersection of the first annotated segment and the second annotated segment as a final annotated segment for the piece of time-series data; and
S46: assigning a review tag to a union segment of the piece of time-series data which has a duration from a start of the first annotated segment to an end of the second annotated segment.

2. The labeling method of claim 1, wherein the method further comprises S48 of recommending, after determining whether there is an intersection between each first annotated segment and each second annotated segment, at least one stand-alone segment of one unit of the first and second agent units, which do not intersect with any segment of the other unit of the first and second agent units, to one or more units of the first and second agent units as recommend tags.

3. The labeling method of claim 1, wherein the steps S2 and S3 for annotating the piece of time-series data are performed by artificial intelligence (AI) models.

4. The labeling method of claim 1, wherein the steps S2 and S3 for annotating the piece of time-series data are performed by users.

5. The labeling method of claim 1, wherein the first agent unit and the second agent unit include artificial intelligence (AI) models for assisting the user on reviewing the disparity between user works on the piece of time-series data.

6. The labeling method of claim 1, wherein the step S43 further comprises: returning to S2 to annotate the piece of time-series data based on the label of the second annotated segment sent to the first agent unit; and returning to S3 to annotate the piece of time-series data based on the label of the first annotated segment sent to the second agent unit.

7. The labeling method of claim 1, wherein the step S46 further comprises: returning to S2 to annotate the piece of time-series data based on the assigned review tag; and returning to S3 to annotate the piece of time-series data based on the assigned review tag.

8. The labeling method of claim 1, wherein the discrepancy-over-union ratio between the first annotated segment and the second annotated segment is computed using the following equation:

$$XoU = \frac{(|start_1 - start_2| + |end_1 - end_2|)}{\max\left(\max(end_1, end_2) - \min(start_1, start_2), 10^{-6}\right)}$$

where, $start_1$ is the start of the first annotated segment, $start_2$ is the start of the second annotated segment, $end_1$ is the end of the first annotated segment, and $end_2$ is the end of the second annotated segment.

9. A labeling system comprising:
a first agent unit is configured to annotate a piece of time-series data to generate a first annotated piece of time-series data with at least one first annotated segment;
a second agent unit is configured to annotate the piece of time-series data to generate a second annotated piece of time-series data with at least one second annotated segment; and
a labeling apparatus is configured to process the first annotated piece of time-series data and the second annotated piece of time-series data, wherein the processing comprises:
S41: determining whether there is an intersection between the first annotated segment and the second annotated segment,
in response to determining that there is an intersection between the first annotated segment and the second annotated segment, proceeding to S42, and
in response to determining that there is not an intersection between the first annotated segment and the second annotated segment, ending the processing;
S42: determining whether the first annotated segment and the second annotated segment have different labels from each other,
in response to determining that the first annotated segment and the second annotated segment have different labels from each other, proceeding to S43, and
in response to determining that the first annotated segment and the second annotated segment do not have different labels from each other, proceeding to S44;
S43: sending the label of the first annotated segment to the second agent unit and the label of the second annotated segment to the first agent unit;
S44: determining whether a discrepancy-over-union ratio between the first annotated segment and the second annotated segment is below a first threshold,
in response to determining that a discrepancy-over-union ratio between the first annotated segment and the second annotated segment is below a first threshold, proceeding to S45, and
in response to determining that a discrepancy-over-union ratio between the first annotated segment and the second annotated segment is not below a first threshold, proceeding to S46;

S45: determining the intersection of the first annotated segment and the second annotated segment as a final annotated segment for the piece of time-series data; and S46: assigning a review tag to a union segment of the piece of time-series data which has a duration from a start of the first annotated segment to an end of the second annotated segment.

10. The labeling system of claim 9, wherein the system is further configured to recommend, after determining whether there is an intersection between each first annotated segment and each second annotated segment, at least one stand-alone segment of one unit of the first and second agent units, which do not intersect with any segment of the other unit of the first and second agent units, to one or more units of the first and second agent units as recommend tags.

11. The labeling system of claim 9, wherein the first agent unit and second agent unit using artificial intelligence (AI) models for annotating the piece of time-series data.

12. The labeling system of claim 9, wherein the first agent unit and second agent unit are used by users for annotating the piece of time-series data.

13. The labeling system of claim 9, wherein the first agent unit and the second agent unit include artificial intelligence (AI) models for assisting the user on reviewing the disparity between user works on the piece of time-series data.

14. The labeling system of claim 9, wherein the first agent unit is configured to annotate the piece of time-series data based on the label of the second annotated segment sent to the first agent unit; and the second agent unit is configured to annotate the piece of time-series data based on the label of the first annotated segment sent to the second agent unit.

15. The labeling system of claim 9, wherein the first agent unit is configured to annotate the piece of time-series data based on the assigned review tag; and the second agent unit is configured to annotate the piece of time-series data based on the assigned review tag.

16. The labeling system of claim 9, wherein the discrepancy-over-union ratio between the first annotated segment and the second annotated segment is computed using the following equation:

$$XoU = \frac{(|start_1 - start_2| + |end_1 - end_2|)}{\max\left(\max(end_1, end_2) - \min(start_1, start_2), 10^{-6}\right)}$$

where, $start_1$ is the start of the first annotated segment, $start_2$ is the start of the second annotated segment, $end_1$ is the end of the first annotated segment, and $end_2$ is the end of the second annotated segment.

17. A non-transitory computer-readable storage medium comprising instructions which, when executed by at least one processor of a machine, cause the machine to perform the labeling method of claim 1.

18. A labeling method comprising:

S1: feeding a piece of time-series data to a first agent unit and a second agent unit;

S2: annotating, by the first agent unit, the piece of time-series data to generate a first annotated piece of time-series data with at least one first annotated segment;

S3: annotating, by the second agent unit, the piece of time-series data to generate a second annotated piece of time-series data with at least one second annotated segment; and S4: processing, by a labeling apparatus, the first annotated piece of time-series data and the second annotated piece of time-series data, wherein the processing comprises:

S41: determining whether there is an intersection between the first annotated segment and the second annotated segment, in response to determining that there is an intersection between the first annotated segment and the second annotated segment, proceeding to S42, and in response to determining that there is not an intersection between the first annotated segment and the second annotated segment, ending the processing;

S42: determining whether the first annotated segment and the second annotated segment have different labels from each other, in response to determining that the first annotated segment and the second annotated segment have different labels from each other, proceeding to S43, and in response to determining that the first annotated segment and the second annotated segment do not have different labels from each other, proceeding to S44;

S43: sending the label of the first annotated segment to the second agent unit and the label of the second annotated segment to the first agent unit;

S44: determining whether an intersection-over-union ratio between the first annotated segment and the second annotated segment exceeds a second threshold, in response to determining that the intersection-over-union ratio between the first annotated segment and the second annotated segment exceeds a second threshold, proceeding to S45, and in response to determining that the intersection-over-union ratio between the first annotated segment and the second annotated segment does not exceed a second threshold, proceeding to S46;

S45: determining the intersection of the first annotated segment and the second annotated segment as a final annotated segment for the piece of time-series data; and S46: assigning a review tag to a union segment of the piece of time-series data which has a duration from a start of the first annotated segment to an end of the second annotated segment.

19. A non-transitory computer-readable storage medium comprising instructions which, when executed by at least one processor of a machine, cause the machine to perform the labeling method of claim 18.

* * * * *